(12) United States Patent
Xia et al.

(10) Patent No.: US 10,530,548 B2
(45) Date of Patent: Jan. 7, 2020

(54) UNIFYING MESSAGE TO SUPPORT DOWNLINK BEAM MANAGEMENT OVER MULTIPLE GROUPS OF BEAM PAIRED LINKS (MGBPL)

(71) Applicant: Futurewei Technologies, Inc., Plano, TX (US)

(72) Inventors: Pengfei Xia, San Diego, CA (US); Bin Liu, San Diego, CA (US)

(73) Assignee: FUTUREWEI TECHNOLOGIES, INC., Plano, TX (US)

( * ) Notice: Subject to any disclaimer, the term of this patent is extended or adjusted under 35 U.S.C. 154(b) by 1 day.

(21) Appl. No.: 15/855,157

(22) Filed: Dec. 27, 2017

(65) Prior Publication Data

US 2018/0331805 A1     Nov. 15, 2018

Related U.S. Application Data

(60) Provisional application No. 62/506,197, filed on May 15, 2017.

(51) Int. Cl.
*H04W 72/04*     (2009.01)
*H04L 5/00*     (2006.01)

(52) U.S. Cl.
CPC ......... *H04L 5/0051* (2013.01); *H04W 72/042* (2013.01); *H04W 72/046* (2013.01); *H04W 72/0466* (2013.01)

(58) Field of Classification Search
CPC ............................ H04B 7/0617; H04W 72/046
See application file for complete search history.

(56) References Cited

U.S. PATENT DOCUMENTS

2014/0211731 A1\*   7/2014   Inoue ................. H04B 7/0456
                                                           370/329
2014/0341310 A1   11/2014   Rahman et al.
(Continued)

FOREIGN PATENT DOCUMENTS

CN          105027461 A     11/2015

OTHER PUBLICATIONS

Nokia et al.,"On Beam Grouping and Reporting," 3GPP TSG-RAN WG1 Meeting #88bis, R1-1705959, Spokane, WA, USA, Apr. 3-7, 2017, 12 pages.
(Continued)

*Primary Examiner* — Chi H Pham
*Assistant Examiner* — Fahmida S Chowdhury
(74) *Attorney, Agent, or Firm* — Slater Matsil, LLP

(57) ABSTRACT

A transmit-receive-point (TRP) may send a beam management configuration message to a user equipment (UE) that includes downlink beam management configuration parameters to use for an ensuing beam management procedure between the TRP and the UE. The beam management configuration message may specify various parameters associated with TRP/UE beams that are to be evaluated during the beam management procedure, directional transmission/reception capabilities of the TRP (e.g., how many transmit-beams and/or receive-beams the TRP is capable of using for simultaneous direction reception/transmission, etc.), spreading sequence parameters (e.g., which spreading sequence, or spreading sequence group, is to be used during the beam management procedure), and/or beam management protocol information.

20 Claims, 6 Drawing Sheets

600

610 — RECEIVE A BEAM MANAGEMENT CONFIGURATION MESSAGE FROM A TRANSMIT/RECEIVE POINT (TRP) THAT INCLUDES BEAM SETTINGS OF THE TRP, SPREADING SEQUENCE SETTINGS, OR A BEAM MANAGEMENT PROTOCOL TO BE USED DURING A BEAM MANAGEMENT PROCEDURE BETWEEN THE UE AND THE TRP

620 — TRANSMIT OR RECEIVE REFERENCE SIGNALS TO/FROM THE TRP ACCORDING TO THE BEAM SETTING OF THE TRP, THE SPREADING SEQUENCE SETTINGS, OR THE BEAM MANAGEMENT PROTOCOL INCLUDED IN THE BEAM MANAGEMENT CONFIGURATION MESSAGE

(56) References Cited

U.S. PATENT DOCUMENTS

| | | |
|---|---|---|
| 2016/0323022 A1 | 11/2016 | Rahman et al. |
| 2017/0094531 A1 | 3/2017 | Kakishima et al. |
| 2018/0048375 A1* | 2/2018 | Guo ...................... H04B 7/088 |
| 2018/0102827 A1* | 4/2018 | Noh .................... H04B 7/0452 |

OTHER PUBLICATIONS

3GPP TR 38.802 V2.0.0, 3rd Generation Partnership Project; Technical Specification Group Radio Access Network; Study on New Radio (NR) Access Technology; Physical Layer Aspects (Release 14), Mar. 2017, 134 pages.

* cited by examiner

UNIFYING MESSAGE TO SUPPORT DOWNLINK BEAM MANAGEMENT OVER MULTIPLE GROUPS OF BEAM PAIRED LINKS (MGBPL)

This application claims priority to U.S. Provisional Patent Application 62/506,197 filed on May 15, 2017 and entitled "Unifying Message to Support Downlink Beam Management over Multi Groups of Beam Paired Links (MGBPL)," which is incorporated herein by reference as if reproduced in its entirety.

TECHNICAL FIELD

The present specification relates generally to telecommunications, and in particular embodiments, to a unifying message to support downlink beam management over multi groups of beam paired links (MGBPL).

BACKGROUND

Wireless signals communicated at high carrier frequencies, such as millimeter Wave (mmW) signals, tend to exhibit high free-space path loss. To compensate for high path loss rates, high-frequency communications may use beamforming at both the transmit/receive point (TRP) and user equipment (UE). Beam management techniques may be used to identify, or otherwise discover, beam directions to use for initial data transmission/reception, as well as to adapt, or otherwise update, beam directions as the spatial characteristics of the air interface change due to, for example, UE mobility.

SUMMARY

Technical advantages are generally achieved, by embodiments of this disclosure which describe techniques for a unifying message to support downlink beam management over multi groups of beam paired links (MGBPL).

In accordance with an embodiment, a method for beam management. In this embodiment, the method includes receiving a beam management configuration message from a transmit/receive point (TRP) that includes beam settings of the TRP, spreading sequence settings, or a beam management protocol to be used during a beam management procedure between the UE and the TRP, and transmitting or receiving reference signals to or from the TRP according to the beam setting of the TRP, the spreading sequence settings, or the beam management protocol included in the beam management configuration message. In one example, the beam management configuration message includes a number of transmit beams of the TRP that are to be evaluated during the beam management procedure, a number of transmit beams over which the TRP can simultaneously transmit reference signals during the beam management procedure, a number transmit-chains over which the TRP can simultaneously transmit reference signals during the beam management procedure, or a combination thereof. In that example, or in another example, the beam management configuration message includes a number of receive beams of the TRP that are to be evaluated during the beam management procedure, a number of receive beams over which the TRP can simultaneously receive reference signals during the beam management procedure, a number receive-chains over which the TRP can simultaneously receive reference signals during the beam management procedure, or a combination thereof. In any one of the preceding examples, or in another example, the beam management configuration message assigns a spreading sequence or a group of spreading sequences to the UE or a group of UEs, respectively, for transmitting or receiving reference signals during the beam management procedure. In any one of the preceding examples, or in another example, the beam management configuration message assigns a predefined beam management protocol in a group of predefined beam management protocols to be used during the beam management procedure between the UE and the TRP, where each beam-management protocol in the group of predefined beam management protocols requiring different input parameters. An apparatus for performing this method is also provided.

In accordance with another embodiment, another method for beam management is provided. In this example, the method includes transmitting a beam management configuration message to a user equipment (UE) that includes beam settings of the TRP, spreading sequence settings, or a beam management protocol to be used during a beam management procedure between the UE and the TRP, and transmitting or receiving reference signals to or from the UE according to the beam setting of the TRP, the spreading sequence settings, or the beam management protocol included in the beam management configuration message. In one example, the beam management configuration message includes a number of transmit beams of the TRP that are to be evaluated during the beam management procedure, a number of transmit beams over which the TRP can simultaneously transmit reference signals during the beam management procedure, a number transmit-chains over which the TRP can simultaneously transmit reference signals during the beam management procedure, or a combination thereof. In that example, or in another example, the beam management configuration message includes a number of receive beams of the TRP that are to be evaluated during the beam management procedure, a number of receive beams over which the TRP can simultaneously receive reference signals during the beam management procedure, a number receive-chains over which the TRP can simultaneously receive reference signals during the beam management procedure, or a combination thereof. In any one of the preceding examples, or in another example, the beam management configuration message assigns a spreading sequence or a group of spreading sequences to the UE or a group of UEs, respectively, for transmitting or receiving reference signals during the beam management procedure. In any one of the preceding examples, or in another example, the beam management configuration message assigns a predefined beam management protocol in a group of predefined beam management protocols to be used during the beam management procedure between the UE and the TRP, where each beam-management protocol in the group of predefined beam management protocols requiring different input parameters. In any one of the preceding examples, or in another example, the beam management configuration message includes a transmit-beam-group index (TBG index) associated with a transmit-beam-group, and beam indices associated with transmit-beams within the transmit-beam-group. In any one of the preceding examples, or in another example, the beam management configuration message further includes a number of candidate reference signal (RS) resources assigned to carry reference signals transmitted over transmit-beams in the transmit-beam-group. In any one of the preceding examples, or in another example, the beam management configuration message further includes a number of reference signal transmissions that will be performed over each transmit-beam in the transmit-beam-group. In any one of the preceding examples, or in another example, the beam management configuration message includes a receive beam group (RGB) index associated with a receive-beam-groups, and beam indices associated with receive-beams within the receive-beam-group. In any one of the preceding examples, or in another example, the beam management configuration message further includes a number of candidate transmit-beams within a transmit-beam-group. In any one of the preceding examples, or in another example, the beam management configuration message further includes a number of reference signal transmissions that will be performed over each transmit-beam in the transmit-beam-group. In any one of the preceding examples, or in another example, the beam management configuration message includes a spreading sequence group index (SSG index) associated with each of a plurality of spreading-sequence-groups, as well as spreading sequence indices associated with spreading sequences in a corresponding one the plurality of spreading-sequence-groups. In any one of the preceding examples, or in another example, the beam management configuration message further includes a number of candidate transmit-beams within a transmit-beam-group. An apparatus for performing this method is also provided.

BRIEF DESCRIPTION OF THE DRAWINGS

For a more complete understanding of the present specification, and the advantages thereof, reference is now made to the following descriptions taken in conjunction with the accompanying drawings, in which.

DETAILED DESCRIPTION OF ILLUSTRATIVE EMBODIMENTS

Figure 1:
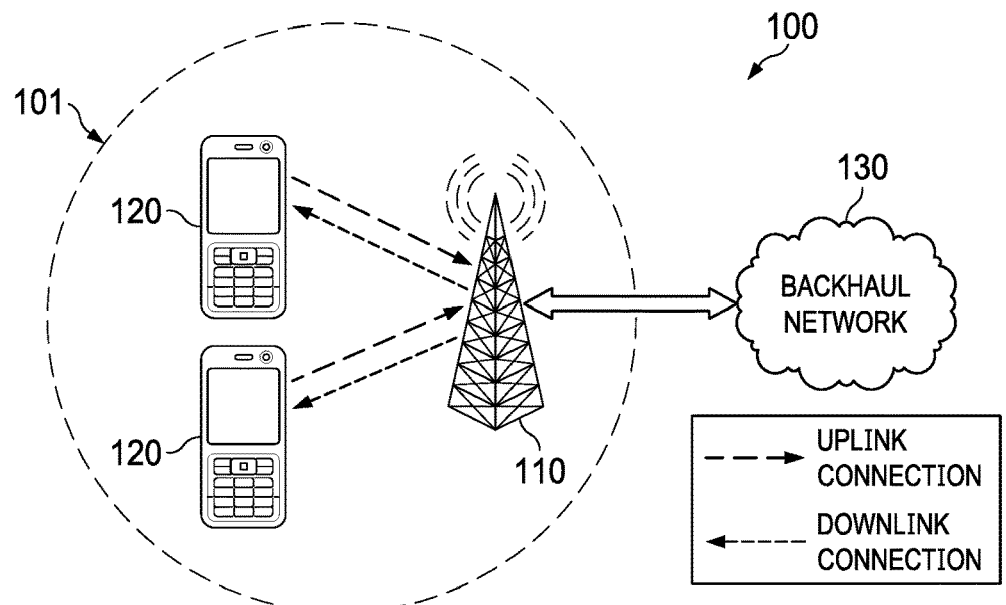
FIG. 1 is a diagram of an embodiment wireless communications network.

The structure, manufacture and use of embodiments are discussed in detail below. It should be appreciated, however, that this disclosure provides many applicable inventive concepts that can be embodied in a wide variety of specific contexts. The specific embodiments discussed are merely illustrative of specific ways to make and use the embodiments, and do not limit the scope of the embodiments. As used herein, the term "beam direction" refers to a radio antenna pattern, or set of beamforming weights, that is used for directional signal transmission and/or reception. The terms "beam directions" and "beams" are used interchangeably herein. A beam direction that is used by a UE to receive a signal is generally referred to as a "UE receive-beam" or "UE receive-beam direction," and a beam direction that is used by a UE to transmit a signal is generally referred to as a "UE transmit-beam" or "UE transmit-beam direction." Likewise, a beam direction that is used by a transmit/receive point (TRP) to receive a signal is generally referred to as a point "TRP receive-beam" or "TRP receive-beam direction," and a beam direction that is used by a TRP to transmit a signal is generally referred to as a "TRP transmit-beam" or "TRP transmit-beam direction." The term "transmit-beam" may refer to either a TRP transmit-beam or a UE transmit-beam, and the term "receive-beam" may refer to either a TRP receive-beam or a UE receive-beam. The term "SRS resource" may refer to a time-domain, frequency-domain resource, a code-domain resource, or a combination thereof (e.g., a time-frequency resource, etc.). In one example, an SRS resource refers to an "antenna port," which maps to a pattern of resource elements in a shared channel. Other examples are also possible.

Aspects of this disclosure communicate a beam management configuration message that includes downlink beam management configuration parameters to use for an ensuing beam management procedure between a TRP and a UE. The beam management configuration message may include various parameters associated with TRP/UE beams that are to be evaluated during the beam management procedure, directional transmission/reception capabilities of the TRP (e.g., how many transmit-beams and/or receive-beams the TRP is capable of using for simultaneous direction reception/transmission, etc.), spreading sequence parameters (e.g., which spreading sequence, or spreading sequence group) to be used during the beam management procedure, and/or a beam management protocol to be used during the beam management procedure. It should be appreciated that each spreading sequence group may be associated with a different spreading sequence group index (SSG index), and that each spreading sequence in a spreading sequence group may be associated with a different spreading sequence index.

In one embodiment, a beam management configuration message specifies one or more parameters associated with a transmit-beam/transmit-beam-group setting that will be used to transmit reference signals during the beam management procedure between the TRP and the UE. In such an embodiment, the beam management configuration message may indicate (i) one or more beam group indices associated with one or more transmit-beam-groups, (ii) a set of beam indices associated with different transmit-beams in a transmit-beam-group, (iii) a number of candidate transmit-beams in a given transmit-beam-group, (iv) a number of times/repetitions reference signals will be transmitted over respective transmit-beams in a transmit-beam-group, (v) indices associated with spreading sequences that will be used to transmit reference signals over different transmit-beams in a specific transmit-beam-group and/or in different transmit-beam-groups, (vi) time-frequency resource sets/patterns (e.g., combinations of resource elements (REs) in a resource block (RB)) that will be used to transmit reference signals over different transmit-beam in a specific transmit-beam-group and/or different transmit-beam-groups. It should be appreciated that each transmit-beam-group may be associated with a different transmit-beam-group index (TBG index), and that each transmit beam within a transmit-beam-group may be associated with a different transmit-beam index. In one example, a beam management configuration message includes a transmit-beam-group index (TBG index) associated with a transmit-beam-group, and/or beam indices associated with transmit-beams within the transmit-beam-group. In such an example, the beam management configuration message may further indicate a number of candidate reference signal (RS) resources assigned to carry reference signals transmitted over transmit-beams in the transmit-beam-group.

In another embodiment, a beam management configuration message specifies parameters associated with a receive-beam/receive-beam-group that will be used to receive reference signals for purposes of beam management. It should be appreciated that each receive-beam-group may be associated with a different receive-beam-group index (RBG index), and that each receive beam within a receive-beam-group may be associated with a different receive-beam index. In one example, a beam management configuration message includes a receive-beam-group index (RBG index) associated with a receive-beam-group, and/or beam indices associated with receive-beams within the transmit-beam-group. In such an example, the beam management configuration message may further indicate a number of candidate reference signal (RS) resources assigned to carry reference signals received over transmit-beams in the transmit-beam-group. The parameters associated with the receive-beam/receive-beam-group may be similar to those discussed above with respect to the transmit-beam/transmit-beam-group. For example, the parameters associated with a receive-beam/receive-beam-group may include a receive-beam-group index, beam indices of receive-beams within a given receive-beam-group, a number of receive-beams within a given receive-beam-group, a time/frequency pattern that will carry downlink reference signals to be received using either a specific receive-beam or receive-beams in a specific receive-beam-group, or combinations thereof.

A beam management configuration message may also indicate an association between a specific TRP transmit-beam and a specific UE receive-beam, a specific TRP transmit-beam and a specific UE receive-beam-group, a specific TRP transmit-beam-group and a specific UE receive-beam, and/or a specific TRP transmit-beam-group and a specific UE receive-beam-group. In this way, the beam management configuration message may notify the UE of which UE receive-beams are to be evaluated for a given TRP transmit-beam and/or a given TRP transmit-beam-group. Alternatively, a beam management configuration message may indicate an association between a specific UE transmit-beam and a specific TRP receive-beam, a specific UE transmit-beam and a specific TRP receive-beam-group, a specific UE transmit-beam-group and a specific TRP receive-beam, and/or a specific UE transmit-beam-group and a specific TRP receive-beam-group. In this way, the beam management configuration message may notify the UE of which UE transmit-beams are to be evaluated for a given TRP receive-beam and/or a given TRP receive-beam-group.

The beam management configuration message may also identify a specific beam management protocol to use during the beam management procedure between the TRP and the UE. When the beam management configuration message includes a first protocol/procedure (P1) for beam management, then different combinations of TRP transmit-beams and UE receive-beams may be evaluated. When the beam management configuration message includes a second protocol/procedure (P2) for beam management, then different TRP transmit-beams may be evaluated using the same UE receive-beam. When the beam management configuration message includes a third protocol/procedure (P3) for beam management, then different UE receive-beams may be evaluated using the same TRP transmit-beam. In one example, the beam management configuration message identifies a predefined beam management protocol in a group of predefined beam management protocols, where each beam-management protocol in the group of predefined beam management protocols requires different input parameters. These and other inventive aspects are described in greater detail below.

FIG. 1 is a network 100 for communicating data. The network 100 comprises a transmit/receive point (TRP) no having a coverage area 101, a plurality of UEs 120, and a backhaul network 130. As shown, the network TRP no establishes uplink (dashed line) and/or downlink (dotted line) connections with the UEs 120, which serve to carry data from the UEs 120 to the network TRP 110 and vice-versa. Data carried over the uplink/downlink connections may include data communicated between the UEs 120, as well as data communicated to/from a remote-end (not shown) by way of the backhaul network 130. As used herein, the term "transmit/receive point (TRP)" refers to any component (or collection of components) configured to provide wireless access to a network, such as a base station (BS), an enhanced Node B (eNB), a macro-cell, a femtocell, a Wi-Fi access point (AP), or other wirelessly enabled devices. Network TRPs may provide wireless access in accordance with one or more wireless communication protocols, e.g., 5th generation new radio (5G_NR), long term evolution (LTE), LTE advanced (LTE-A), High Speed Packet Access (HSPA), Wi-Fi 802.11a/b/g/n/ac, etc. As used herein, the term "user equipment (UE)" refers to any component (or collection of components) capable of establishing a wireless connection with a network TRP, such as a mobile device, a mobile station (STA), and other wirelessly enabled devices. In some embodiments, the network 100 may comprise various other wireless devices, such as relays, low power nodes, etc.

Figure 2:
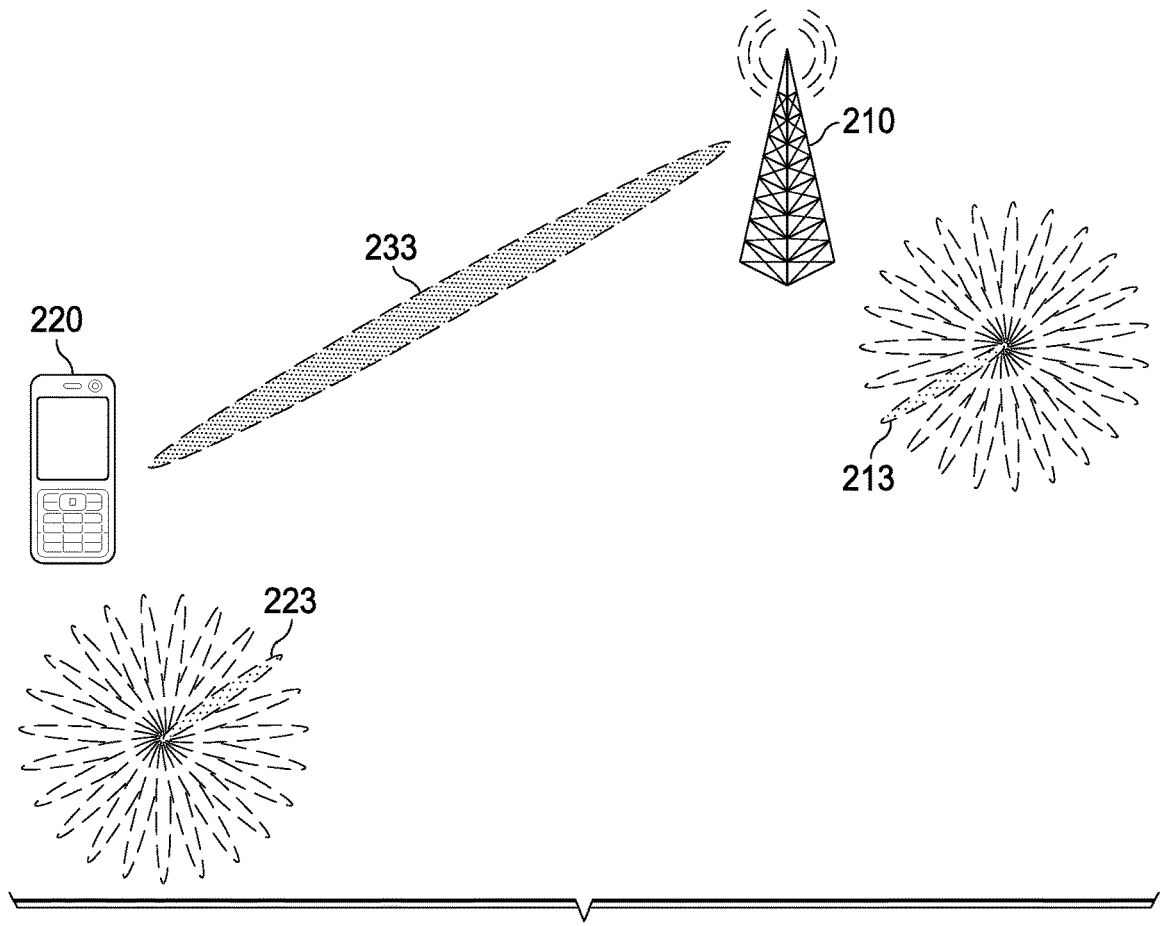
FIG. 2 is a diagram of beamformed transmission from a TRP to a UE.

FIG. 2 is a diagram of a data signal that is communicated using directional transmission and reception techniques. As shown, the TRP 210 transmits the data signal using the TRP transmit-beam direction 213, and the UE 220 receives the data signal 233 using the UE receive-beam direction 223.

Figure 3A:
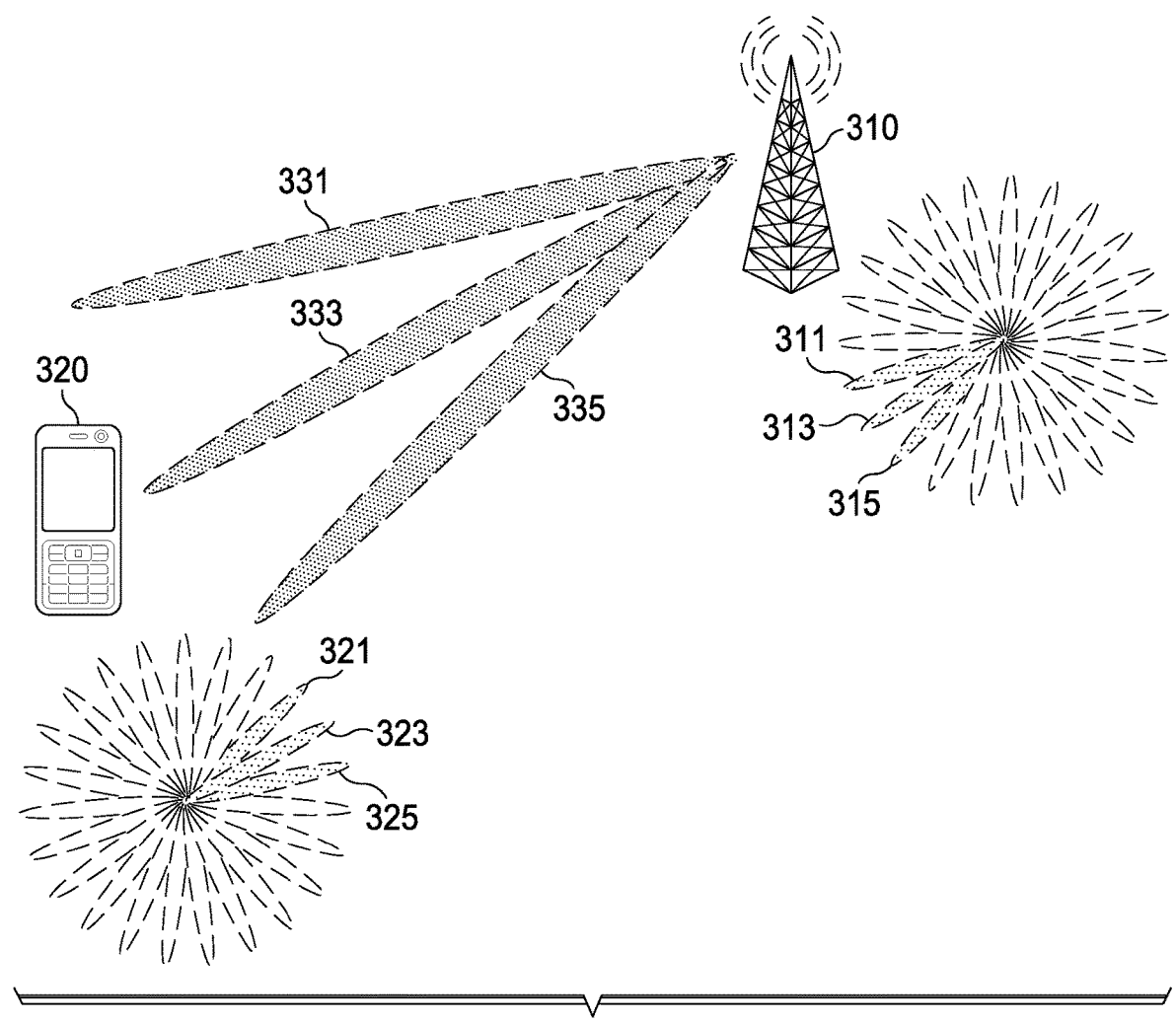
FIGS. 3A and 3B illustrate a downlink beam procedures in an embodiment.
Figure 3B:
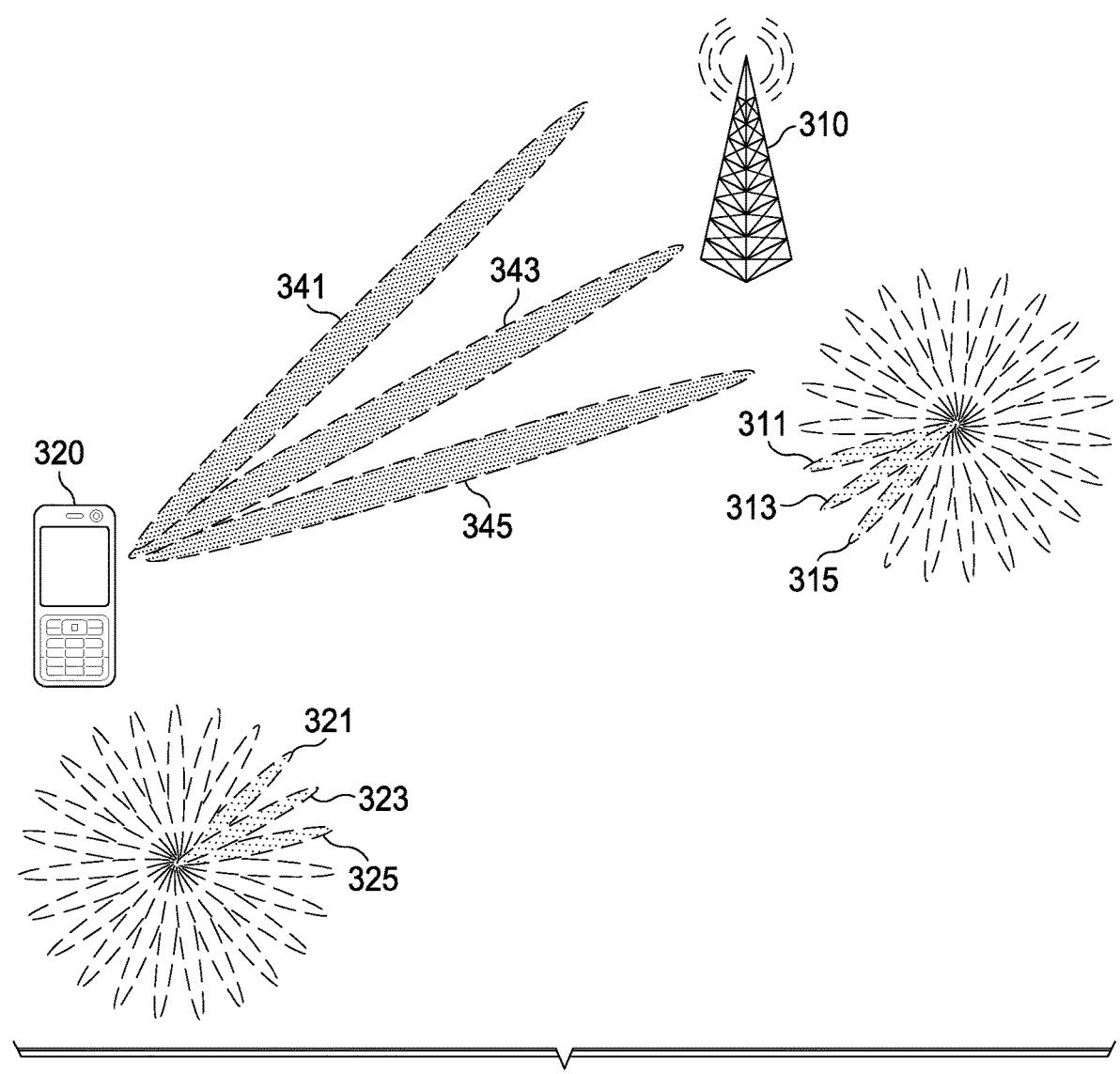

In order to identify which transmit and receive-beam directions to use for transmitting and receiving a downlink data transmission, a beam management procedure may be performed to evaluate different combinations of candidate TRP transmit-beams and candidate UE receive-beams. FIGS. 3A-3B are diagram of beam management procedures. In FIG. 3A, a TRP 310 transmits downlink reference signals 331, 333, 335 using TRP transmit-beams 311, 313, 315 (respectively), and the UE 320 receives the downlink reference signals 331, 333, 335 using UE beams 321, 323, 325. The UE 320 may then select a pair of respective TRP and UE beams based on received signal quality and/or power levels associated with the downlink reference signals 331, 333, 335, and send an indication of the selected TRP beam to the TRP.

In FIG. 3B, the UE 320 transmits uplink reference signals 341, 343, 345 using UE beams 321, 323, 325 (respectively), and the TRP 310 receives the uplink reference signals 341, 343, 345 using TRP beams 311, 313, 315. The TRP 310 may then select a pair of respective TRP and UE beams based on received signal quality and/or power levels associated with the uplink reference signals 341, 343, 345, and send an indication of the selected UE beam to the UE.

When beam correspondence is present on both the UE-side and the TRP-side of the air interface, a given UE/TRP beam will offer a similar level of spatial performance irrespective of whether the beam is being used for directional transmission/reception. Thus, when beam correspondence is present, only one of the beam management procedures depicted by FIG. 3A and FIG. 3B may be required to select UE/TRP beams for uplink and downlink communications. When beam correspondence is not present on either the UE-side or the TRP-side of the air interface, then the beam management procedure depicted by FIG. 3A may be needed to select UE/TRP beams for downlink communications, and the beam management procedure depicted by FIG. 3B may be needed to select UE/TRP beams for uplink communications.

Additionally, it should be appreciated that, in some instances, each of the downlink reference signals 331, 333, 335 and/or uplink reference signals 341, 343, 345 may be transmitted multiple times (e.g., three times/repetitions per reference signal) so that each combination of TRP beams 311, 313, 315 and UE beams 321, 323, 325 may be evaluated.

In some instances, a TRP and/or a UE may include multiple antenna arrays, in which case each antenna array may be associated with a specific set of beam directions. In such instances, the antenna array may be located far enough away from one another such that they are not "co-located" with one another, meaning that the antenna arrays will generally yield different spatial performance characteristics depending on the relative orientation and/or position of the respective UE and/or TRP. When antenna arrays of a given device are not "co-located" with one another, the respective antenna arrays may be associated with different sets of beam directions. That is to say, a set of beam directions associated with one antenna array may be considered to be mutually exclusive with a set of beam directions associated with the other antenna array because different spatial performance characteristics may result when the set of beamforming weights are applied to the respective antenna arrays due to the distance separating the antennas, or the relative orientation of the antennas (e.g., the radiating face of the antennas may be facing different directions).

Figure 4:
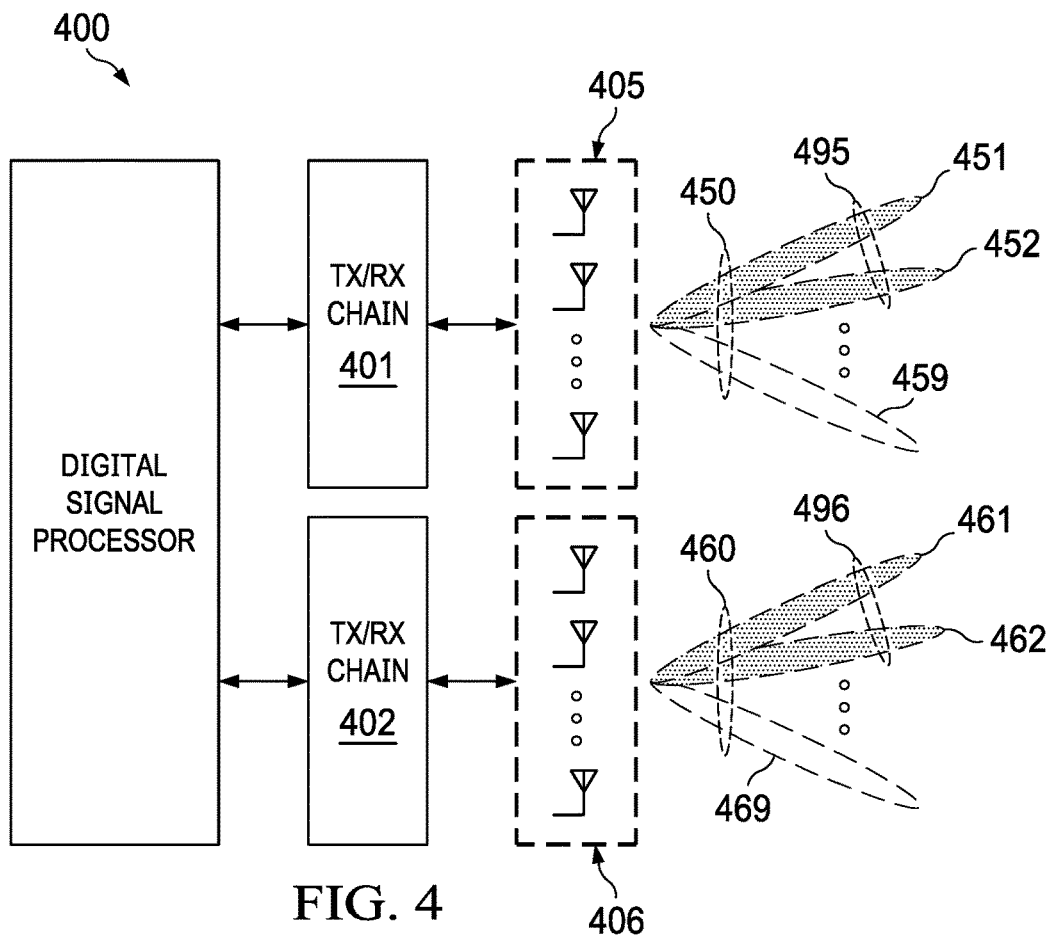
FIG. 4 is a diagram of an embodiment transceiver configured to directionally transmit and/or receive reference signals.

FIG. 4 is a diagram of a transceiver 400 configured to transmit and/or receive beamformed signals using different antenna arrays. As shown, the transceiver 400 includes a TX/RX chain 401 coupled to an antenna array 405, and a TX/RX chain 402 coupled to an antenna array 406. In this example, the TX/RX chain 401 is capable of transmitting and receiving signals over the antenna array 405 using a set of beam directions 450 that includes beam directions 451-459, and the TX/RX chain 401 is capable of transmitting and receiving signals over the antenna array 406 using a set of beam directions 460 that includes beam directions 461-469. The antenna arrays 405, 406 positioned/oriented in such a way that they are not "co-located" with one another, and as a result, the respective sets of beam directions 450, 460 may be considered mutually exclusive in so far as each beam direction in the set of beam direction 450 may generally provide a different level of spatial performance than each beam direction in the set of beam direction 460.

Initially, the transceiver 400 transmits or receives downlink reference signals over each beam direction in the respective sets of beam directions 450, 460, and then selects a corresponding group of beam directions 495, 496 from the respective sets of beam directions 450, 460. When the transceiver 400 is a UE that receives the downlink reference signals over beam directions in the respective sets of beam directions 450, 460, then the transceiver 400 may select the groups of beam directions 495, 496 based on received signal quality/power levels associated with the downlink reference signals. When the transceiver 400 is a TRP that transmits the downlink reference signals over beam directions in the respective sets of beam directions 450, 460, then the transceiver 400 may select the groups of beam directions 495, 496 based on a feedback message received from the UE that receives the downlink signals. The feedback message may explicitly identify beams in the respective groups of beam directions 495, 496. For example, the feedback message may specify beam indices associated with individual beam directions in the respective groups of beam directions 495, 496. Alternatively, the feedback may implicitly identify beams in the respective groups of beam directions 495, 496. As one example, the feedback message may identify the resources over which selected downlink reference signals are received, and the TRP may identify/select beam directions, to be included in the respective groups of beam directions 495, 496, based on which beam directions were used to transmit the reference signals over the resources identified by the feedback message. As another example, when different time-domain spreading sequences are used to transmit reference signals over different beams, then the feedback message may identify the time-domain spreading sequences associated which downlink reference signals having the best received signal quality/power level. This may allow the TRP to identify/select beam directions, to be included in the respective groups of beam directions 495, 496, based on which time-domain spreading sequences where used to transmit reference signals over corresponding beam directions in the respective sets of beam directions 450, 460.

It should be appreciated that the number of beam directions that can be simultaneously used to transmit and/or receive reference signals over a given antenna array may depend on the number of TX/RX chains connected to the antenna array. For example, the transceiver 400 may only be capable of transmitting/receiving signals over a single beam direction in the set of beam directions 450 during a given time interval because the antenna array 405 is connected to a single TX/RX chain 401. Likewise, the transceiver 400 may only be capable of transmitting/receiving signals over a single beam direction in the set of beam directions 460 during a given time interval because the antenna array 406 is connected to a single TX/RX chain 402. It should also be appreciated that different antenna arrays may be used to simultaneously transmit/receive reference signals using different beam directions when the antenna arrays are connected to separate TX/RX chains. For example, the transceiver 400 may be capable of transmitting/receiving signals over the antenna array 405 and the antenna array 406 using, for instance, the beam direction 451 and the beam direction 461 during the same time interval such that the respective transmitted/received signals are time division multiplexed with one another.

Figure 5:
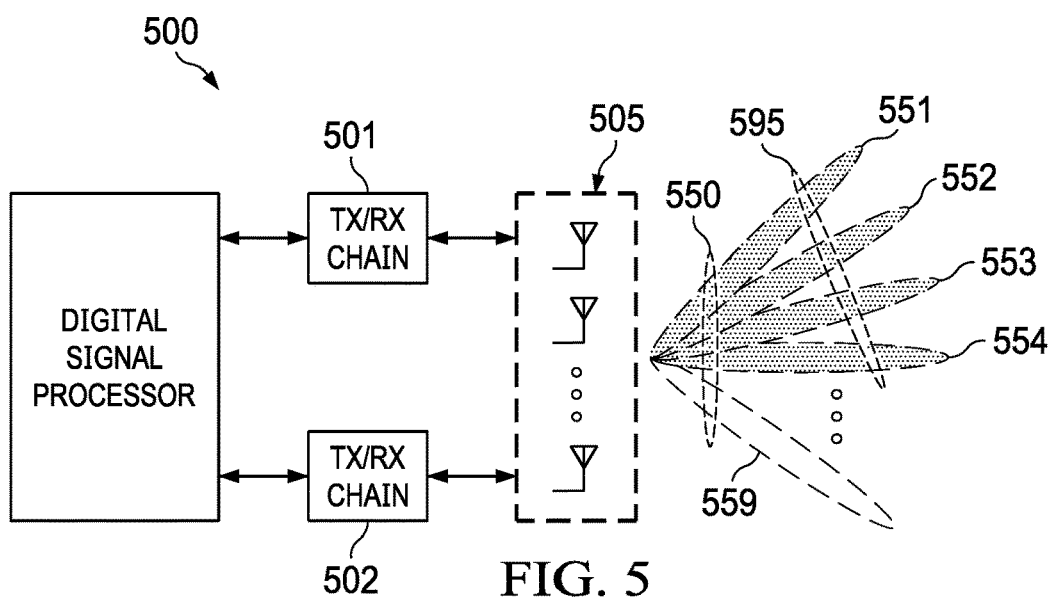
FIG. 5 is another diagram of an embodiment transceiver configured to directionally transmit and/or receive reference signals.

In some embodiments, multiple TX/RX chains are connected to the same antenna array, in which case the corresponding TRP/UE may be capable of simultaneously transmitting/receiving signals over multiple beam directions in the same group of beam directions. FIG. 5 is a diagram of a transceiver 500 configured to transmit and receive beamformed signals using multiple TX/RX chains. As shown, the transceiver 500 includes TX/RX chains 501, 502 coupled to an antenna array 505. A set of beam directions 550 that includes beam direction 551-559 is associated with the antenna array 505. Because two TX/RX chains 501, 502 are coupled to the antenna array 505, the transceiver 500 is capable of simultaneously transmitting and/or receiving signals over two beam directions in the set of beam directions 550. Although the transceiver 500 is depicted as having two TX/RX chains 501, 502 connected to a single antenna array 505, it should be appreciated that embodiment transceivers may have any number of TX/RX chains connected to any number of antenna arrays.

Figure 6:
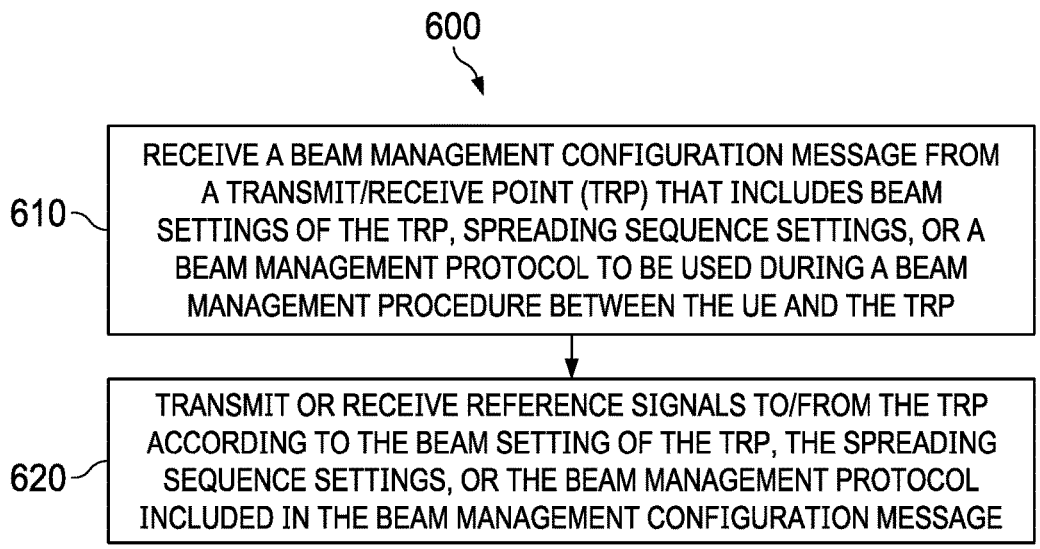
FIG. 6 is a flowchart of an embodiment beam management method.

FIG. 6 is a flowchart of an embodiment method 600 for beam management, as may be performed by a UE. At step 610, the UE receives a beam management configuration message from a transmit/receive point (TRP) that includes beam settings of the TRP, spreading sequence settings, or a beam management protocol to be used during a beam management procedure between the UE and the TRP. At step 620, the UE transmits or receives reference signals to/from the TRP according to the beam setting of the TRP, the spreading sequence settings, or the beam management protocol included in the beam management configuration message. The UE or TRP may then select UE and/or TRP beams to use for downlink/uplink communications based on received signal quality and/or power levels associated with the reference signals.

Figure 7:
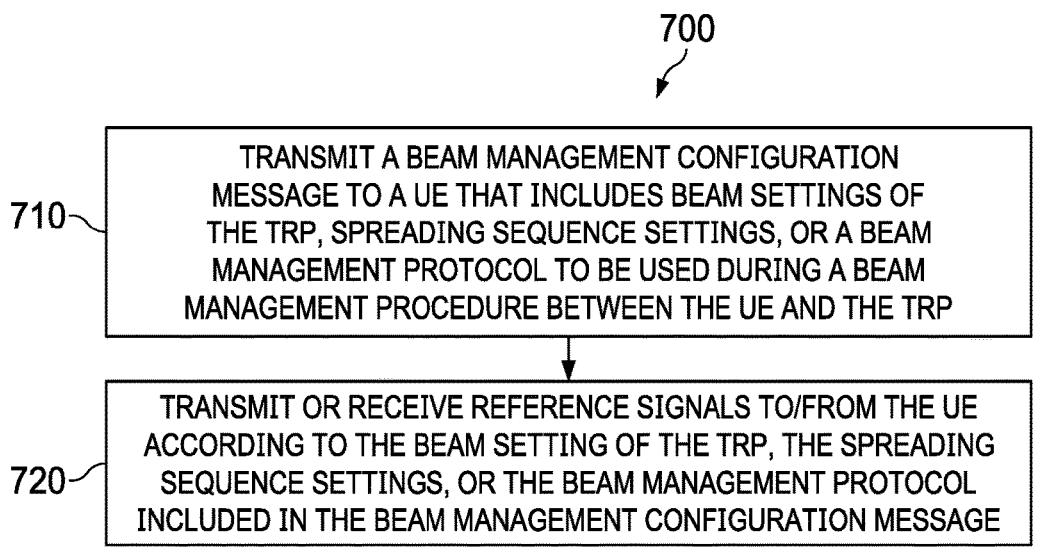
FIG. 7 is a flowchart of another embodiment beam management method.

FIG. 7 is a flowchart of an embodiment method 700 for beam management, as may be performed by a TRP. At step 710, the TRP transmits a beam management configuration message to a UE that includes beam settings of the TRP, spreading sequence settings, or a beam management protocol to be used during a beam management procedure between the UE and the TRP. At step 720, the TRP transmits or receives reference signals to/from the UE according to configuration parameters indicated by the beam management configuration message reference signals to/from the UE according to the beam setting of the TRP, the spreading sequence settings, or the beam management protocol included in the beam management configuration message. After steps 620/720, the UE and/or TRP may select UE and/or TRP beams to use for downlink/uplink communications based on received signal quality and/or power levels associated with the received reference signals.

A beam management configuration message that includes beam management configuration parameters of one or more TRP transmit-beams/transmit-beam-groups and/or one or more UE receive-beams/beam-groups may be sent from a TRP to a UE, after which time the beam management configuration parameters indicated by the beam management configuration message may be used during an ensuing beam management procedure to select a beam paired link (BPL) or a group of beam paired links (BPLs) for communicating a data signal. As used herein, a "beam paired link (BPL)" refers to a pair of transmit-beams and receive-beams that are used for directional transmission and reception of a wireless signal, and a "group of beam paired links (BPLs)" refers to two or more pairs of transmit-beams and receive-beams that are used for directional transmission and reception of a multi-layer MIMO wireless signal.

The beam management configuration message may indicate various beam management configuration parameters and/or combinations of beam management parameters.

In some embodiments, a beam management configuration message specifies transit-beam configuration parameters, such as a number of TRP transmit-beams that are to be evaluated during the ensuing beam management procedure between the UE and the TRP, a number of transmit-beams over which the TRP can simultaneously transmit reference signals during the ensuing beam management procedure between the UE and the TRP, and/or a number transmit-chains over which the TRP can simultaneously transmit reference signals during the beam management procedure between the UE and the TRP. In one example, the beam management configuration message one or more transmit-beam-group indices (TBG indices) associated with one or more transmit-beam-groups. In another example, the beam management configuration message includes a set of beam indices associated with transmit-beams within each transmit-beam-group and/or a number of candidate transmit-beams within each transmit-beam-group. For instance, the beam management configuration message may include a TBG index associated with a TRP transmit-beam-group, as well as associate a number of beams (e.g., three beams, five beams, etc.) with said TBG index. As another example, the beam management configuration message may include a TBG index associated with a TRP transmit-beam-group, as well a TRP beam index associated with each TRP beam that is to be evaluated in said transmit-beam-group. In the same or different embodiments, the beam management configuration message may also indicate a number of times/repetitions reference signals will be transmitted over respective transmit-beams in a transmit-beam-group, one or more spreading sequence group indices (SSG indices) associated with groups of spreading sequences that will be used to transmit reference signals over different transmit-beam-group, and/or time-frequency resource sets/patterns that will be used to transmit reference signals over different transmit-beam-groups.

In the same or different embodiments, a beam management configuration message specifies receive-beam configuration parameters, such as a number of TRP receive-beams that are to be evaluated during the ensuing beam management procedure between the UE and the TRP, a number of receive-beams over which the TRP can simultaneously receive reference signals during the ensuing beam management procedure between the UE and the TRP, and/or a number receive-chains over which the TRP can simultaneously receive reference signals during the beam management procedure between the UE and the TRP. In one example, the beam management configuration message one or more receive beam group indices (RBG indices) associated with one or more receive-beam-groups. In another example, the beam management configuration message includes a set of beam indices associated with receive-beams within each receive beam-group and/or a number of candidate transmit-beams within each transmit-beam-group. For instance, the beam management configuration message may include an RBG index associated with a TRP transmit-beam-group, as well as associate a number of receive-beams (e.g., three beams, five beams, etc.) with said RBG index. As another example, the beam management configuration message may include a RBG index associated with a TRP transmit-beam-group, as well a TRP beam index associated with each TRP beam that is to be evaluated in said transmit-beam-group. In the same or different embodiments, the beam management configuration message may also indicate a number of times/repetitions reference signals will be received over respective receive-beams in a given receive-beam-group, one or more spreading sequence group indices (SSG indices) associated with groups of spreading sequences that will be used to communicate reference signals over different receive-beam-groups, and/or time-frequency resource sets/patterns that will be used to communicate reference signals over different receive-beam-groups.

In the same or different embodiments, a beam management configuration message may associate a time-domain spreading sequence with a specific TRP beam or TRP-beam-group, e.g., a specific TRP transmit-beam, a specific TRP receive-beam, a specific TRP transmit-beam-group, a specific TRP receive-beam-group, etc. In one example, the beam management configuration message includes multiple TBG indices associated with different transmit-beam-groups, and then associates a different spreading-sequence-group with each of the respective transmit-beam-groups. In such an example, each spreading-sequence-group may include spreading sequences that have the same spreading sequence length. Alternatively, two or more of the spreading-sequence-groups may include spreading sequences that have different spreading sequence lengths. As used herein, the term "spreading sequence length" generally refers to the number of time-domain symbols over which a given spreading sequence, or respective spreading sequences in a given spreading sequence group, distribute the amplitude of a corresponding reference signal. In this way, longer spreading sequences distribute a reference signal over a larger set of time-domain resources than shorter spreading sequences.

In one example, a beam management configuration message associates different spreading sequences with different combinations of transmit-beam-groups and receive-beam-groups. By way of example, if two transmit-beam-groups and three receive-beam-groups are being evaluated during a given beam management session, then the beam management configuration message may indicate six spreading sequence groups such that a different spreading-sequence group is associated with each combination of the transmit-beam-group and three receive-beam-group. In some embodiments, different time domain spreading sequences are assigned to different UEs.

A beam management configuration message may also identify a specific procedure to use for beam management. For example, a beam management configuration message may identify a first procedure (P1) for beam management when different TRP transmit-beams are to be evaluated for different UE receive-beams, a second procedure (P2) for beam management when different TRP transmit-beams are to be evaluated for a fixed UE receive-beam, or a third procedure (P3) for beam management when different UE receive-beams are to be evaluated using a fixed TRP transmit-beam.

In an embodiment, a beam management configuration message that is used in conjunction with the first procedure (P1) for beam management (e.g., a beam management procedure configured to evaluate different combinations of TRP transmit-beams and UE receive-beams) may indicate one or more TBG group indices associated with one or more transmit-beam-group(s) that include transmit-beams that are to be evaluated, a number of transmit-beams that are to be evaluated in a given transmit-beam-group, a set of transmit-beam indices associated with transmit-beams that are to be evaluated, one or more RBG indices associated with one or more receive-beam-group that include receive-beams that are to be evaluated, a number of receive-beams that are to be evaluated in a given receive-beam-group, receive beam indices associated with the receive-beams that are to be evaluated in a given receive-beam-group, one or more spreading sequence indices associated with one or more time-domain spreading sequences that are to be used for transmitting reference signals during the beam management session, and/or one or more SSG indices associated with one or more group of time-domain spreading sequences that are to be used for transmitting reference signals during the beam management session.

In another embodiment, a beam management configuration message that is used in conjunction with the second procedure (P2) for beam management (e.g., a beam management procedure configured to evaluate different TRP transmit-beams for a fixed UE receive-beam) may indicate one or more TBG group indices associated with one or more transmit-beam-group(s) that include transmit-beams that are to be evaluated, a number of transmit-beams that are to be evaluated in a given transmit-beam-group, a set of transmit-beam indices associated with transmit-beams that are to be evaluated, an RBG index associated with a receive-beam-group that includes the receive beam that is to be evaluated, a receive beam index associated with the receive beam that is to be evaluated, one or more spreading sequence indices associated with one or more time-domain spreading sequences that are to be used for transmitting reference signals during the beam management session, and/or one or more SSG indices associated with one or more group of time-domain spreading sequences that are to be used for transmitting reference signals during the beam management session.

In yet another embodiment, a beam management configuration message that is used in conjunction with the third procedure (P3) for beam management (e.g., a beam management procedure configured to evaluate different UE receive-beams for a fixed TRP transmit-beam) may indicate one or more RBG group indices associated with one or more receive-beam-groups that include receive-beams that are to be evaluated, a number of receive-beams that are to be evaluated in a given receive-beam-group, a set of receive beam indices associated with receive-beams that are to be evaluated, a TBG index associated with a transmit-beam-group that includes the transmit-beam that is to be evaluated, a transmit-beam index associated with the transmit-beam that is to be evaluated, one or more spreading sequence indices associated with one or more time-domain spreading sequences that are to be used for transmitting reference signals during the beam management session, and/or one or more SSG indices associated with one or more group of time-domain spreading sequences that are to be used for transmitting reference signals during the beam management session.

A UE may periodically send beam management reports to a TRP to indicate information pertaining to one or more received reference signals, e.g., TRP transmit-beam indices associated with the reference signals, time-domain spreading sequences associated with the references, a set of resources over which the reference signals were received, etc. Alternatively, beam management reports may be aperiodically triggered by a network device, such as a TRP.

Different transmit-beam-groups and/or receive-beam-groups associated with a given TRP or UE may include beams with different beam-widths. By way of example, one beam group that provides approximately 360 degrees of coverage may include eight beams each of which having approximately a 45 degree beam-width, while another beam group that provides approximately 360 degrees of coverage may include thirty-two beams each of which having approximately an 11.25 degree beam-width. In some embodiments, beams within the same beam group may have different beam widths. For example, a beam group that provides approximately 360 degrees of coverage may include four beams that have approximately a 45 degree beam-width and sixteen beams that have approximately an 11.25 degree beam width. In some embodiments, different beam groups may correspond to different spatial regions and/or ranges of interest. By way of example, a device may include four beam groups each of which covering a different 90 degree spatial region. Other examples are possible.

In an embodiment, a beam management configuration message may indicate a layer one reference signal (RS) resource setting (e.g., also referred to as an outer layer RS resource setting) that includes one or more RS-resource-set to be used for a combination of beam management procedures. For example, the RS-resource-set associated with the layer one RS resource setting may be used for any combination of the first procedure (P1) for beam management, the second procedure (P2) for beam management, and the third procedure (P3) for beam management. A beam management configuration message that includes layer one RS resource settings may also specify parameters associated with the RS resource sets for which the layer one RS resource settings apply, such as a duration associated with the RS resource set, a starting resource location associated with each RS resource set, an ending resource location associated with each RS resource set, a periodicity associated with each RS resource set, a number of times reference signals will be transmitted over each RS resource set, or a combination thereof. In some embodiments, a RS resource set is persistently assigned such that the RS resource set assignment is valid until a network device (e.g., a TRP) affirmatively withdraws the RS resource set assignment via explicit signaling.

In another embodiment, a beam management configuration message may indicate a layer two RS resource setting (e.g., also referred to as a middle layer RS resource setting) that includes a RS-resource-set to be used for a particular beam management procedure. In one example, the RS-resource-set associated with the layer two RS resource setting may be used for the first procedure (P1) for beam management. In another example, the RS-resource-set associated with the layer two RS resource setting may be used for the second procedure (P2) for beam management. In yet another example, the RS-resource-set associated with the layer two RS resource setting may be used for third procedure (P3) for beam management.

In yet another embodiment, a beam management configuration message may indicate a layer three RS resource setting (e.g., also referred to as an inner layer RS resource setting) that specifies beam management characteristics for a particular reference signal resource (e.g., set of REs used to transmit a reference signal) and/or a specific reference signal transmission. By way of example, a layer three RS resources setting may specify a transmit-beam, a receive beam, and/or time-domain spreading sequence to be used either when transmitting reference signals over a specific RS resource or when transmitting/receiving a specific reference signal. Layer three RS resource settings may include a specific time-frequency pattern, orthogonal cover code (OCC) pattern, and/or time-domain spreading sequence pattern. Other examples are also possible.

It should be appreciated that, if a particular parameter is used for all RS-resources within a given RS-resource-set, then the parameter may be deemed a layer two RS resource setting. Likewise, if a particular parameter is used for all RS-resource-sets within a group of RS resources sets, then the parameter may be deemed a layer three RS resource setting.

In some embodiments, a common beam management configuration message includes layer one RS resource settings, layer two RS resource settings, and/or three RS resource settings. In other embodiments, layer one RS resource settings, layer two RS resource settings, and/or three RS resource settings are indicated by separate beam management configuration messages. Beam management configuration messages may have various messaging types/formats. For example, beam management configuration messages may be downlink control information (DCI) messages, radio resource control (RRC) messages, and/or media access control (MAC) control element (MAC-CE) messages.

In some embodiments, beam management configuration information is signaled via DCI messages in order to achieve low latency configuration of beam management parameters. In other embodiments, beam management configuration information is signaled via RRC messages in order to achieve low overhead configuration of beam management parameters. In yet other embodiments, beam management configuration information is signaled via a combination of DCI and RRC messages to balance the benefits of low latency and low overhead configuration of beam management parameters. In such embodiments, reference signals resources may be activated/assigned using DCI messages, while other beam management configuration parameters (e.g., spreading sequence assignments, etc.) may be signaled via RRC messages. In yet other embodiments, beam management configuration information is signaled via a combination of DCI, RRC, and MAC-CE messages.

Different RS-resource-settings may be assigned for periodic/aperiodic beam management, cell-specific/user specific beam management, coarse/fine beam management, beam tracking, beam recovery, and/or channel acquisition. RS-resource-settings assignments for beam management may generally have longer periodicities and/or duty cycles than RS-resource setting assignments for channel acquisition. Layer one/two/three RS-resource-settings may be pre-configured via an initial RRC message and/or MAC-CE re-configuration message, and then subsequently activated via a separate RRC message and/or DCI message.

In an embodiment, a second procedure (P2) for beam management may be configured by a TRP through the communication of any combination of the following parameters: (i) Procedure index: bit fields indicating P2; (ii) Index of a transmit-beam-group (iii) Number of candidate transmit-beams to be evaluated in transmit-beam-group; (iv) Number of repetitions/times reference signals will be transmitted over each transmit-beam; (v) Index of spreading sequence, or group of spreading sequences, to be used for reference signal transmissions; (vi) Index of receive-beam-group that includes receive beam that is to be evaluated; and (vii) receive beam index of receive beam that is to be evaluated. These parameters may be signaled via an RRC message, a MAC-CE message, a DCI message, or a combination thereof.

In another embodiment, a third procedure (P3) for beam management may be configured by a TRP through communication of any combination of the following parameters: (i) Procedure index: bit fields indicating P2; (ii) Index of a receive-beam-group (iii) Number of candidate receive-beams to be evaluated in receive-beam-group; (iv) Number of repetitions/times reference signals will be transmitted over evaluated transmit-beam; (v) Index of spreading sequence, or group of spreading sequences, to be used for reference signal transmissions; (vi) Index of transmit-beam-group that includes transmit-beam that is to be evaluated; and (vii) transmit-beam index of transmit-beam that is to be evaluated. These parameters may be signaled via an RRC message, a MAC-CE message, a DCI message, or a combination thereof.

In another embodiment, an iterative beam management procedure (e.g., a P2 beam management session followed by a P3 beam management session, or vice versa) may be configured by a TRP through communication of any combination of the following parameters: (i) starting and/or ending time of the P2 beam management portion of the iterative session; (ii) duration of the P2 beam management portion of the iterative session; (iii) starting and/or ending time of the P3 beam management portion of the iterative session; (iv) duration of the P3 beam management portion of the iterative session; (v) time/frequency separation between the P2 beam management portion of the iterative session and the P3 beam management portion of the iterative session; and (vi) time/frequency separation between the P3 beam management portion of the iterative session and the P2 beam management portion of the iterative session.

In some embodiments, a beam management configuration message may indicate UE transmit-beam/receive-beam parameters. For example, a beam management configuration message may associate a specific TRP beam (e.g., TRP transmit-beam, TRP receive-beam, etc.) with a specific UE beam (e.g., UE transmit-beam, UE receive-beam, etc.) such that the respective beam-pair will be evaluated during the ensuing beam management procedure. As another example, the beam management configuration message may associate a specific TRP beam-group (e.g., a TRP transmit-beam-group or receive-beam-group) with a specific UE beam (e.g., UE transmit-beam, UE receive-beam, etc.) such that each TRP beam in the identified TRP beam group will be evaluated with using the identified UE beam. As yet another example, the beam management configuration message may associate a specific TRP beam-group (e.g., a TRP transmit-beam-group or receive-beam-group) with a specific UE beam group (e.g., UE transmit-beam-group or receive-beam-group) such that each TRP beam in the identified TRP beam group will be evaluated with each UE beam in the identified UE beam group. Other examples are also possible.

In an embodiment, a method for beam management signaling is provided. In this embodiment, the method includes transmitting, by a transmit/receive point (TRP), a first reference signal (RS)-resource-setting-specific configuration message which applies to all RS-resource-sets within the relevant RS-resource-setting, transmitting, by the TRP, a RS-resource-set-specific configuration message which applies throughout all RS-resources within the relevant RS-resource-set; and transmitting, by the TRP, a RS-resource-specific configuration message which applies for the relevant RS-resource. In one example, the RS-resource-setting-specific message is delivered to the UE using RRC messages, or MAC-CE messages, or DCI messages, or a combination of the three. In the same example, or in another example, the RS-resource-set-specific message is delivered to the UE using RRC messages, or MAC-CE messages, or DCI messages, or a combination of the three. In any one of the preceding examples, or in another example, the RS-resource-specific message is delivered to the UE using RRC messages, or MAC-CE messages, or DCI messages, or a combination of the three.

Figure 8:
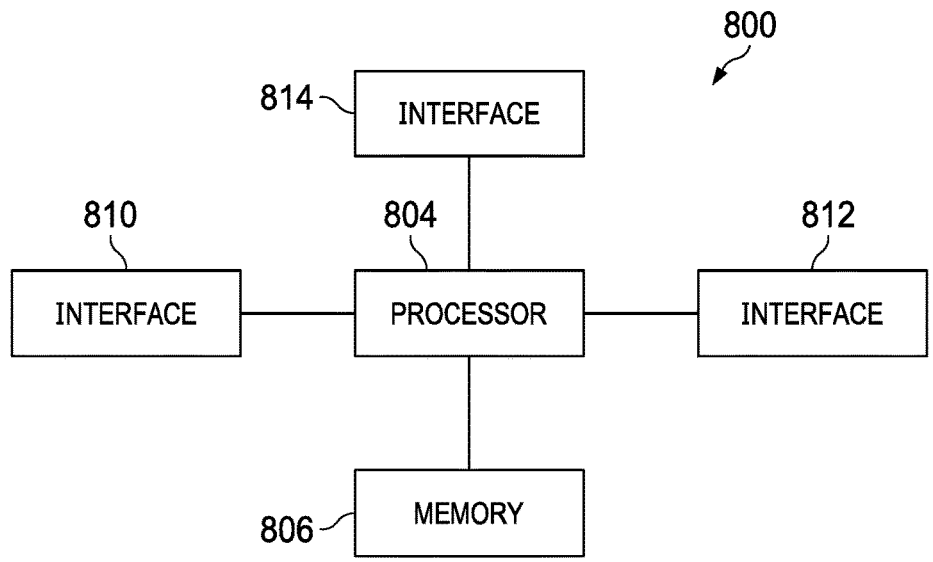
FIG. 8 is a block diagram of an embodiment processing system for performing methods described herein.

FIG. 8 illustrates a block diagram of an embodiment processing system 800 for performing methods described herein, which may be installed in a host device. As shown, the processing system 800 includes a processor 804, a memory 806, and interfaces 810-814, which may (or may not) be arranged as shown in FIG. 8. The processor 804 may be any component or collection of components adapted to perform computations and/or other processing related tasks, and the memory 806 may be any component or collection of components adapted to store programming and/or instructions for execution by the processor 804. In an embodiment, the memory 806 includes a non-transitory computer readable medium. The interfaces 810, 812, 814 may be any component or collection of components that allow the processing system 800 to communicate with other devices/components and/or a user. For example, one or more of the interfaces 810, 812, 814 may be adapted to communicate data, control, or management messages from the processor 804 to applications installed on the host device and/or a remote device. As another example, one or more of the interfaces 810, 812, 814 may be adapted to allow a user or user device (e.g., personal computer (PC), etc.) to interact/communicate with the processing system 800. The processing system 800 may include additional components not depicted in FIG. 8, such as long term storage (e.g., non-volatile memory, etc.).

In some embodiments, the processing system 800 is included in a network device that is accessing, or part otherwise of, a telecommunications network. In one example, the processing system 800 is in a network-side device in a wireless or wireline telecommunications network, such as a base station, a relay station, a scheduler, a controller, a gateway, a router, an applications server, or any other device in the telecommunications network. In other embodiments, the processing system 800 is in a user-side device accessing a wireless or wireline telecommunications network, such as a mobile station, a user equipment (UE), a personal computer (PC), a tablet, a wearable communications device (e.g., a smartwatch, etc.), or any other device adapted to access a telecommunications network.

Figure 9:
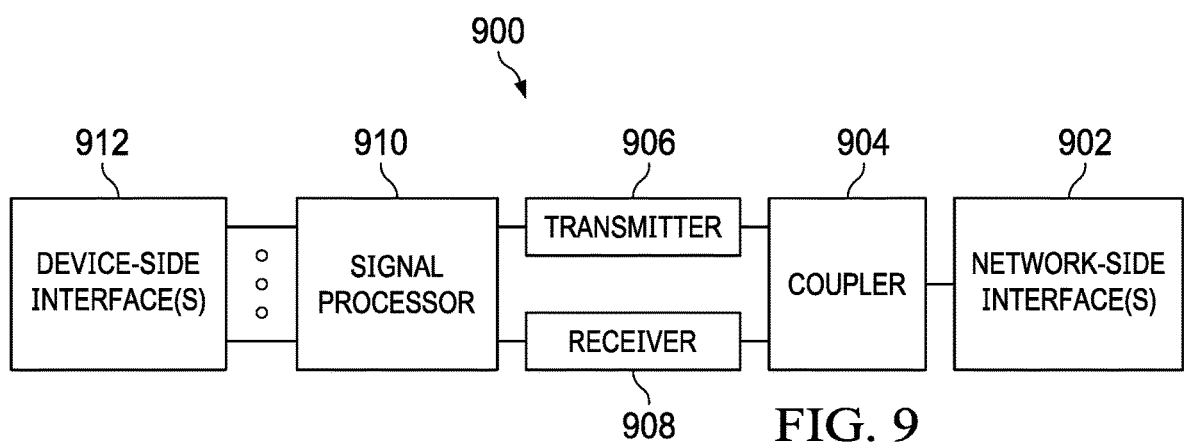
FIG. 9 is a block diagram of a transceiver adapted to transmit and receive signaling over a telecommunications network according to example embodiments described herein.

In some embodiments, one or more of the interfaces 810, 812, 814 connects the processing system 800 to a transceiver adapted to transmit and receive signaling over the telecommunications network. FIG. 9 illustrates a block diagram of a transceiver 900 adapted to transmit and receive signaling over a telecommunications network. The transceiver 900 may be installed in a host device. As shown, the transceiver 900 comprises a network-side interface 902, a coupler 904, a transmitter 906, a receiver 908, a signal processor 910, and a device-side interface 912. The network-side interface 902 may include any component or collection of components adapted to transmit or receive signaling over a wireless or wireline telecommunications network. The coupler 904 may include any component or collection of components adapted to facilitate bi-directional communication over the network-side interface 902. The transmitter 906 may include any component or collection of components (e.g., up-converter, power amplifier, etc.) adapted to convert a baseband signal into a modulated carrier signal suitable for transmission over the network-side interface 902. The receiver 908 may include any component or collection of components (e.g., down-converter, low noise amplifier, etc.) adapted to convert a carrier signal received over the network-side interface 902 into a baseband signal. The signal processor 910 may include any component or collection of components adapted to convert a baseband signal into a data signal suitable for communication over the device-side interface(s) 912, or vice-versa. The device-side interface(s) 912 may include any component or collection of components adapted to communicate data-signals between the signal processor 910 and components within the host device (e.g., the processing system 800, local area network (LAN) ports, etc.).

The transceiver 900 may transmit and receive signaling over any type of communications medium. In some embodiments, the transceiver 900 transmits and receives signaling over a wireless medium. For example, the transceiver 900 may be a wireless transceiver adapted to communicate in accordance with a wireless telecommunications protocol, such as a cellular protocol (e.g., long-term evolution (LTE), etc.), a wireless local area network (WLAN) protocol (e.g., Wi-Fi, etc.), or any other type of wireless protocol (e.g., Bluetooth, near field communication (NFC), etc.). In such embodiments, the network-side interface 902 comprises one or more antenna/radiating elements. For example, the network-side interface 902 may include a single antenna, multiple separate antennas, or a multi-antenna array configured for multi-layer communication, e.g., single input multiple output (SIMO), multiple input single output (MISO), multiple input multiple output (MIMO), etc. In other embodiments, the transceiver 900 transmits and receives signaling over a wireline medium, e.g., twisted-pair cable, coaxial cable, optical fiber, etc. Specific processing systems and/or transceivers may utilize all of the components shown, or only a subset of the components, and levels of integration may vary from device to device.

What is claimed is:

1. A method for beam management, the method comprising:
   receiving, by a user equipment (UE), a beam management configuration message from a transmit receive point (TRP), the beam management configuration message including at least one of beam settings of the TRP, spreading sequence settings, and a beam management protocol to be used during a beam management procedure between the UE and the TRP, the beam management configuration message further indicating a number of reference signal transmissions to be performed over at least one transmit-beam; and
   transmitting or receiving, by the UE, reference signals to or from the TRP according to at least the number of reference signal transmissions indicated by the beam management configuration message and the beam settings of the TRP, the spreading sequence settings, or the beam management protocol included in the beam management configuration message.

2. The method of claim 1, wherein the beam management configuration message includes a number of transmit beams of the TRP that are to be evaluated during the beam management procedure, a number of transmit beams over which the TRP can simultaneously transmit reference signals during the beam management procedure, a number transmit-chains over which the TRP can simultaneously transmit reference signals during the beam management procedure, or a combination thereof.

3. The method of claim 1, wherein the beam management configuration message includes a number of receive beams of the TRP that are to be evaluated during the beam management procedure, a number of receive beams over which the TRP can simultaneously receive reference signals during the beam management procedure, a number receive-chains over which the TRP can simultaneously receive reference signals during the beam management procedure, or a combination thereof.

4. The method of claim 1, wherein the beam management configuration message assigns a spreading sequence or a group of spreading sequences to the UE or a group of UEs, respectively, for transmitting or receiving reference signals during the beam management procedure.

5. The method of claim 1, wherein the beam management configuration message assigns a predefined beam management protocol in a group of predefined beam management protocols to be used during the beam management procedure between the UE and the TRP, each beam-management protocol in the group of predefined beam management protocols requiring different input parameters.

6. A user equipment (UE) comprising:
   a processor; and
   a non-transitory computer readable storage medium storing programming for execution by the processor, the programming including instructions to:
   receiving, by the UE, a beam management configuration message from a transmit receive transmit/receive point (TRP), the beam management configuration message including at least one of beam settings of the TRP, spreading sequence settings, and a beam management protocol to be used during a beam management procedure between the UE and the TRP, the beam management configuration message further indicating a number of reference signal receptions to be performed over at least one receive-beam; and
   transmitting or receiving, by the UE, reference signals to or from the TRP according to at least the number of reference signal receptions indicated by the beam management configuration message and the beam settings of the TRP, the spreading sequence settings, or the beam management protocol included in the beam management configuration message.

7. A method for beam management, the method comprising:
   transmitting, by a transmit receive point (TRP), a beam management configuration message to a user equipment (UE), the beam management configuration message including at least one of beam settings of the TRP, spreading sequence settings, and a beam management protocol to be used during a beam management procedure between the UE and the TRP, the beam management configuration message further indicating a number of reference signal receptions to be performed over at least one receive-beam; and
   transmitting or receiving, by the TRP, reference signals to or from the UE according to at least the number of reference signal receptions indicated by the beam management configuration message and the beam settings of the TRP, the spreading sequence settings, or the beam management protocol included in the beam management configuration message.

8. The method of claim 7, wherein the beam management configuration message includes a number of transmit beams of the TRP that are to be evaluated during the beam management procedure, a number of transmit beams over which the TRP can simultaneously transmit reference signals during the beam management procedure, a number transmit-chains over which the TRP can simultaneously transmit reference signals during the beam management procedure, or a combination thereof.

9. The method of claim 7, wherein the beam management configuration message includes a number of receive beams of the TRP that are to be evaluated during the beam management procedure, a number of receive beams over which the TRP can simultaneously receive reference signals during the beam management procedure, a number receive-chains over which the TRP can simultaneously receive reference signals during the beam management procedure, or a combination thereof.

10. The method of claim 7, wherein the beam management configuration message assigns a spreading sequence or a group of spreading sequences to the UE or a group of UEs, respectively, for transmitting or receiving reference signals during the beam management procedure.

11. The method of claim 7, wherein the beam management configuration message assigns a predefined beam management protocol in a group of predefined beam management protocols to be used during the beam management procedure between the UE and the TRP, each beam-management protocol in the group of predefined beam management protocols requiring different input parameters.

12. The method of claim 7, wherein the beam management configuration message includes a transmit-beam-group index (TBG index) associated with a transmit-beam-group, and beam indices associated with transmit-beams within the transmit-beam-group.

13. The method of claim 12, wherein the beam management configuration message further includes a number of candidate reference signal (RS) resources assigned to carry reference signals transmitted over transmit-beams in the transmit-beam-group.

14. The method of claim 13, wherein the beam management configuration message further includes a number of reference signal transmissions that will be performed over each transmit-beam in the transmit-beam-group.

15. The method of claim 7, wherein the beam management configuration message includes a receive beam group (RGB) index associated with a receive-beam-groups, and beam indices associated with receive-beams within the receive-beam-group.

16. The method of claim 15, wherein the beam management configuration message further includes a number of candidate receive-beams within the receive-beam-group.

17. The method of claim 16, wherein the beam management configuration message further includes a number of reference signal transmissions that will be performed over each receive-beam in the receive-beam-group.

18. The method of claim 7, wherein the beam management configuration message includes a spreading sequence group index (SSG index) associated with each of a plurality of spreading-sequence-groups, as well as spreading sequence indices associated with spreading sequences in a corresponding one the plurality of spreading-sequence-groups.

19. The method of claim 18, wherein the beam management configuration message further includes a number of candidate transmit-beams within a transmit-beam-group.

20. A transmit receive point (TRP) comprising:
a processor; and
a non-transitory computer readable storage medium storing programming for execution by the processor, the programming including instructions to:
transmit a beam management configuration message to a user equipment (UE), the beam management configuration message including at least one of beam settings of the TRP, spreading sequence settings, and a beam management protocol to be used during a beam management procedure between the UE and the TRP, the beam management configuration message further indicating a number of reference signal transmissions to be performed over at least one transmit-beam; and
transmit or receive reference signals to or from the TRP according to at least the number of reference signal transmissions indicated by the beam management configuration message and the beam settings of the TRP, the spreading sequence settings, or the beam management protocol included in the beam management configuration message.

* * * * *

UNITED STATES PATENT AND TRADEMARK OFFICE
CERTIFICATE OF CORRECTION

PATENT NO. : 10,530,548 B2
APPLICATION NO. : 15/855157
DATED : January 7, 2019
INVENTOR(S) : Pengfei Xia Page 1 of 1

It is certified that error appears in the above-identified patent and that said Letters Patent is hereby corrected as shown below:

In the Claims

In Column 18, Line 5, Claim 6, delete "from a transmit receive transmit/receive point" and insert --from a transmit receive point--.

Signed and Sealed this
Twenty-eighth Day of July, 2020

Andrei Iancu
*Director of the United States Patent and Trademark Office*